(12) United States Patent
Bansal et al.

(10) Patent No.: US 11,928,219 B2
(45) Date of Patent: Mar. 12, 2024

(54) DATA RISK HEAT MAPS

(71) Applicant: International Business Machines Corporation, Armonk, NY (US)

(72) Inventors: Rinkesh I. Bansal, Pune (IN); Mahesh Shivram Paradkar, Pune (IN); Raghuraman Seshadri, Bangalore (IN); Nagendra Ramamurthy Pattavardhanam, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 17/348,815

(22) Filed: Jun. 16, 2021

(65) Prior Publication Data
US 2022/0405395 A1     Dec. 22, 2022

(51) Int. Cl.
*G06F 21/57* (2013.01)
(52) U.S. Cl.
CPC ................. *G06F 21/577* (2013.01)
(58) Field of Classification Search
None
See application file for complete search history.

(56) References Cited

U.S. PATENT DOCUMENTS

| | | | |
|---|---|---|---|
| 2015/0324606 A1 | 11/2015 | Grondin | |
| 2015/0326601 A1* | 11/2015 | Grondin | H04L 63/1433 726/25 |
| 2016/0065608 A1* | 3/2016 | Futty | H04L 63/1433 726/25 |
| 2019/0392154 A1 | 12/2019 | Sher-Jan | |
| 2020/0320215 A1* | 10/2020 | Bhosale | G06F 11/1461 |
| 2020/0320451 A1 | 10/2020 | Barday | |
| 2020/0356678 A1* | 11/2020 | Gourisetti | G06F 21/577 |

OTHER PUBLICATIONS

Boehm et al., "Cyber risk measurement and the holistic cybersecurity approach", McKinsey & Company, Nov. 19, 2018, 19 pgs., <https://www.mckinsey.com/business-functions/risk/our-insights/cyber-risk-measurement-and-the-holistic-cybersecurity-approach>.
Moxey., "Pervasive Encryption with CICS Transaction Server for z/OS", IBM Z and LinuxONE Community, 2018, 5 pgs., <https://developer.ibm.com/cics/2018/10/26/pervasive-encryption-cics/>.
White et al., "Getting Started with z/OS Data Set Encryption", Redbooks, Jun. 2018, 218 pgs., IBM, <https://www.redbooks.ibm.com/redbooks/pdfs/sg248410.pdf>.
Wikipedia, "Data security", Wikipedia, The Free Encyclopedia, Jan. 2021, 5 pgs., <https://en.wikipedia.org/wiki/Data_security>.

* cited by examiner

*Primary Examiner* — Fatoumata Traore
(74) *Attorney, Agent, or Firm* — Stephen R. Yoder (57) ABSTRACT

A level of classification for each piece of data of one or more pieces of data is determined. A layer of encryption for each piece of data of the one or more pieces of data is determined. A type of encryption for each piece of data of the one or more pieces of data is determined. Other mechanisms applied to each piece of data of the one or more pieces of data is determined. A first constant for the layer of encryption, a second constant for the type of encryption, a third constant for the other mechanisms applied is determined. A risk factor for each piece of data of the one or more pieces of data is determined.

18 Claims, 4 Drawing Sheets

DATA RISK HEAT MAPS

BACKGROUND

The present invention relates generally to the field of data storage, and more particularly to visualization of data risk in data storage.

In an enterprise, an individual, such as a Chief Security Office (CSO) may be responsible for data security with a primary responsibility of implementing and management of security controls for the confidentiality, integrity, and availability of data that resides in storage for organization. Data is protected through encryption and is normally done at different levels in the enterprise. For example, on the application level, database level, file or dataset level and full disk/tape encryption level.

SUMMARY

Embodiments of the present invention disclose a computer-implemented method, a computer program product, and a system for determining risk factors. In one embodiment, a level of classification for each piece of data of one or more pieces of data is determined. A layer of encryption for each piece of data of the one or more pieces of data is determined. A type of encryption for each piece of data of the one or more pieces of data is determined. Other mechanisms applied to each piece of data of the one or more pieces of data is determined. A first constant for the layer of encryption, a second constant for the type of encryption, a third constant for the other mechanisms applied is determined. A risk factor for each piece of data of the one or more pieces of data is determined.

DETAILED DESCRIPTION

The present invention provides a computer-implemented method, computer program product, and computer system for visualization of data risk. Embodiments of the present invention recognize that in order to have control and take actions regarding data security goals, it is important for an individual to have visibility and insight into the risks that currently exist on the data. Embodiments of the present invention recognize that a user may want to see what is encrypted and what is not (weak or strong), who is accessing it, why and how often, and what is being backed up, etc.

Embodiments of the present invention provide for a system which gives holistic view of data risks wherever it resides and give drill down of implemented mechanism for protection or its absence at the desired level. The proposed system calculates the Risk based on various encryption attributes associated with the data protection mechanism used for the particular block eg: the level of encryption (disk level, file level, database level, etc.) or type of encryption used (symmetric 256 bit, asymmetric, etc.)

In an embodiment, a pyramid of encryption shows different layers where encryption is done. In an embodiment, each layer provides granularity of control over protection for data at that level but does not offer any protection for other layers or across layers. For Example: Full Disk encryption provides encryption for any data stored on the disk. This provides zero performance loss and protection against threats where data thefts due to loss of disk/tape drives. But this layer doesn't provide any protection for data when data moves one layer up which is File/OS layer. Similarly, when OS level encryption is performed, data is protected at OS layer and disk level, but data is not protected when data moves from OS layer to database or application layer, and so on.

In an embodiment, data protection becomes better when you move up the pyramid layer, but it also impacts performance severely and it becomes important for the organization to strike balance between performance and protection. Many organizations adopt encryption only because they want to remain compliant to regulations, but sometimes lose the importance of protecting data or go overboard in protecting the data by applying encryption at multiple layers for data not necessarily classified as super critical or confidential. Appropriate levels of encryption controls should be implemented commensurate with the nature of data.

Figure 1:
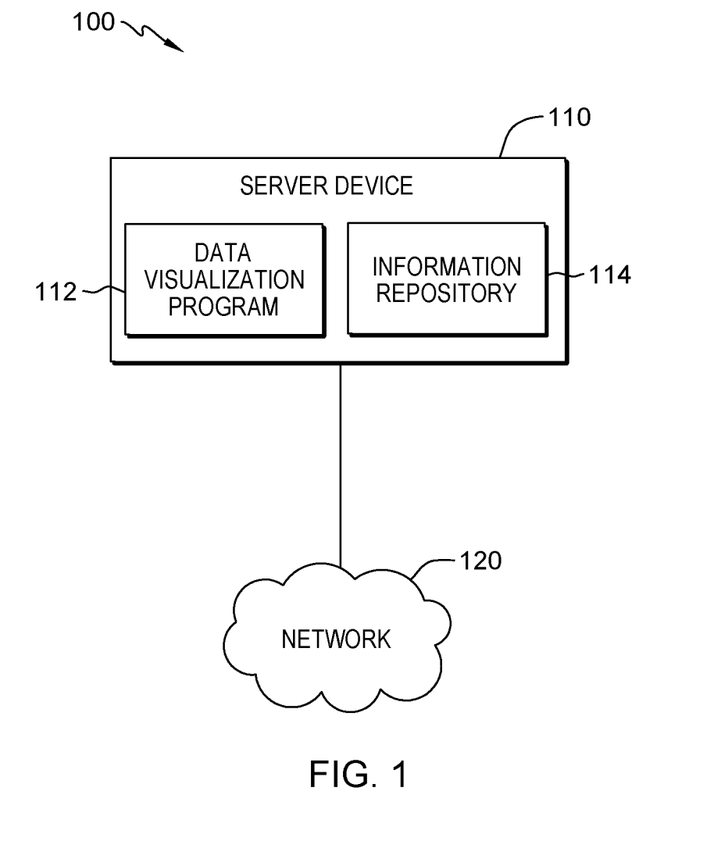
FIG. 1 is a functional block diagram of a network computing environment, generally designated 100, suitable for operation of data visualization program 112, in accordance with at least one embodiment of the invention.

Referring now to various embodiments of the invention in more detail, FIG. 1 is a functional block diagram of a network computing environment, generally designated 100, suitable for operation of data visualization program 112, in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110, interconnected over network 120. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100 via a network, such as network 120.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g., database server computers, application server computers, web servers, and media servers) that act as a single pool of seamless resources when accessed within network computing environment 100.

In an embodiment, computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 110 includes data visualization program 112 and information repository 114.

Embodiments of the present invention provide for a data visualization program 112 for receiving information about data storage data. In an embodiment, data visualization program 112 determines data to be monitored. In an embodiment, data visualization program 112 determines levels of classification of the data. In an embodiment, data visualization program 112 determines encryption levels of the data. In an embodiment, data visualization program 112 determines constants associated with the data.

Embodiments of the present invention provide for a data visualization program 112 for visualization of data risk. In an embodiment, data visualization program 112 receives a data request for data visualization. In an embodiment, data visualization program 112 calculates the risk factor for the requested data. In an embodiment, data visualization program 112 creates a heat map for the requested data. In an embodiment, data visualization program 112 creates details for the requested data.

In an embodiment, server device 110 includes information repository 114. In an embodiment, information repository 114 may be managed by data visualization program 112. In an alternative embodiment, information repository 114 may be managed by the operating system of computing device 110, another program (not shown), alone, or together with, data visualization program 112. Information repository 114 is a data repository that can store, gather, and/or analyze information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided information repository 114 is accessible by computing device 110. In an embodiment, information repository 114 may include data, including, but not limited to, data to be monitored, levels of classification for the data, levels of encrypting for the data, constants used for calculating risk factors for the data, risk factor levels and their associated risk factor level thresholds, heat maps created by data visualization program 112, and details created by data visualization program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Figure 2:
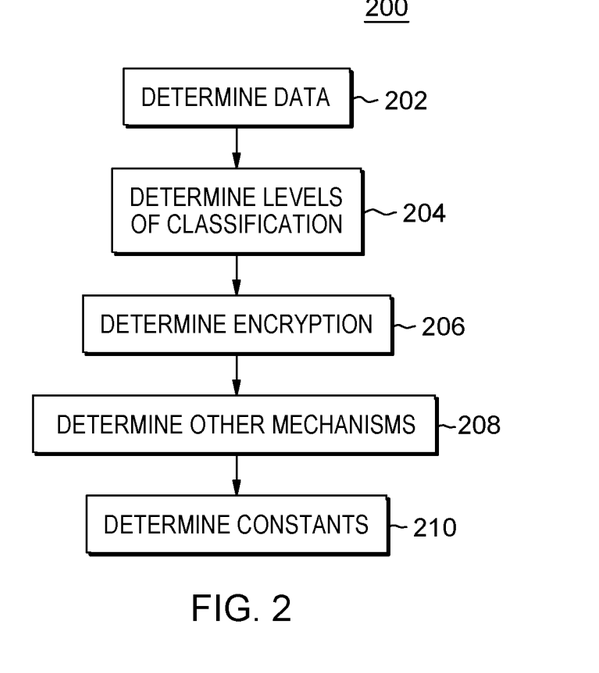
FIG. 2 is a flow chart diagram depicting operational steps for data visualization program 112 for receiving information about data storage, in accordance with at least one embodiment of the invention.

FIG. 2 is a flow chart diagram of workflow 200 depicting operational steps for data visualization program 112 for receiving information about data storage in accordance with at least one embodiment of the invention. In an alternative embodiment, the steps of workflow 200 may be performed by any other program (not shown) while working with data visualization program 112. It should be appreciated that embodiments of the present invention provide at least for receiving information about data storage. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 200 upon a user wanting to store data in information repository 114.

In an embodiment, any of the information about the data found below may be received by data visualization program 112 from a kernel related to the operating system which manages and controls programs running on the operating system and in turn has access to the data/files on the server device 110. Here, the kernel can have programs maintain metadata in information repository 114 that tracks each piece of data and levels of classification for the data, encryption for the data, and other mechanisms that are applied to the data.

Data visualization program 112 determines data (step 202). At step 202, data visualization program 112 determines the data to be analyzed and monitored. In an embodiment, data visualization program 112 may receive an indication that the determined data is all data stored in a specific location. For example, information repository 114. In an embodiment, data visualization program 112 may receive an indication that the determined data is all data owned and/or controlled by a user and/or organization that is stored in one or more locations. For example, all data under control of User A in information repository 114 and other storage locations (not shown) connected to network 120. In an embodiment, the indication of the determine data may be from a user, via the user interface (not shown), of computing device 110 or any other device (not shown). In an alternative embodiment, the indication of the determined data may be from another program (not shown) on computing device 101 or any other device (not shown). In an embodiment, the data may be analyzed on the block level.

Data visualization program 112 determines levels of classification (step 204). At step 204, data visualization program 112 determines the levels of classification for the determined data of step 202. In an embodiment, this may be four types of classification (e.g., normal—1, confidential—2, secret—3, top secret—4). In an alternative embodiment, there may be any number of types of classification. In an embodiment, groups or organizations may have a certain number of classifications. For example, government organization may use a certain number of level of classifications such as top secret—5, secret—4, confidential—3, sensitive—2, and unclassified—1. In another example, non-government organization may use a different number of levels of classifications such as sensitive—5, confidential—4, private—3, proprietary—2, and public—1. In both examples, the risk increases as the level of classification increases or becomes more secure, thus the higher score, therefore there will be a lower risk factor due to an increasing amount of security and thus an increasing value. In an embodiment, determining levels of classification for data is for all data determined in step 202. In an embodiment, the levels of classification for data may be determined by the metadata associated with the data and/or user input. In an embodiment, the level of classification is the first variable used to determine the risk factor in workflow 300.

Data visualization program 112 determines encryption (step 206). At step 206, data visualization program 112 determines the layer and mechanisms of encryption for data. In an embodiment, the layer of encryption includes, but is not limited to, hardware layer, operating system layer, files/folder/volume level layer, and application layer. In an embodiment, the hardware layer (e.g., full disk and tape level) may provide encryption at 100% coverage for at-rest data with zero host CPU cost and protects actions intrusion, tamper, or removal of physical infrastructure. In an embodiment, the operating system layer may provide broad coverage for sensitive data using encryption tied to access control for in-flight and at-rest data protection manage by the operating system (OS) with the ability to eliminate storage administrators from compliance scope. In an embodiment, the files/folder/volume level layer may provide protection for very sensitive in-use (database level or the like), in-flight and at-rest data that allows for selective encryption and granular key management control of sensitive data. In an embodiment, the application layer may provide for hypersensitive data protection by encrypting sensitive data when lower levels of encryption are not available or suitable. Each layer provides granularity of control over protection for data at that level but does not offer any protection for other layers or across layers. For example, full disk encryption provides encryption for any data stored on the disk. This provides zero performance loss and protection against threats where data thefts due to loss of disk/tape drives. But this layer doesn't provide any protection for data when data moves one layer up which is File/OS layer. Similarly, when OS level encryption is performed, data is protected at OS layer and disk level, but data is not protected when data moves from OS layer to database or application layer, and so on. In an embodiment, the layer of encryption for data may be determined by the metadata associated with the data and/or user input. In an embodiment, the layer of encryption is the second variable used to determine the risk factor in workflow 300.

In an embodiment, there may be four levels of encryption as defined by hardware layer, OS layer, file/folder/volume/database layer, and application layer. Here, speed may be the primary importance for the risk factor so the hardware has the highest score and the application layer has the lowest score with scores for the layers in-between being scaled appropriately. In an alternative embodiment, there may be four levels of encryption as defined by hardware layer, OS layer, file/folder/volume/database layer, and application. Here, granularity may be the primary importance for the risk factor so the application layer has the highest score and the hardware layer has the lowest score with scored for the layer in-between being scaled appropriately. In yet another embodiment, there may be any number of layers with any scoring mechanism provided based on the criteria of the user of the user.

In an embodiment, the mechanism of encryption for the data includes, but is not limited to, symmetric key (e.g., Advance Encryption Standard 256, Triple Data Encryption Algorithm, Blowfish Cipher, etc.), asymmetric key such as public-private key pairs (e.g., Rivest-Shamir-Adleman (RSA) public-key cryptosystem, etc.) and no encryption. In an embodiment, determining layer of classification for data is for all data determined in step 202. In an embodiment, the mechanism of encryption for data may be determined by the metadata associated with the data and/or user input. In an embodiment, each mechanism of encryption has a score associated with it. For example, higher security mechanisms of encryption have a higher score, thus reducing the risk factor and lower security mechanism of encryption have a lower score, thus increasing the risk factor. In an embodiment, the mechanism of encryption is the third variable used to determine the risk factor in workflow 300.

Data visualization program 112 determines other mechanisms (step 208). At step 208, data visualization program 112 may determines other mechanism that are employed with the data. In an embodiment, other mechanisms may include, but are not limited to, identity and access management (IAM), intrusion detection system(s) (IDS), intrusion detection and prevention systems (IDPS), physical security, etc. In an embodiment, the other mechanism that are employed with the data may be determined by the metadata associated with the data and/or user input. In an embodiment, the other mechanisms are the fourth variable used to determine the risk factor in workflow 300. In an embodiment, each mechanism has a score associated with it. For example, low security mechanisms (i.e., mechanisms that do not provide much protection from risk) will be lower values and higher security mechanisms (i.e., mechanisms that do provide more protection from risk) will have higher values.

Data visualization program 112 determines constants (step 210). In other words, data visualization program 112 determines the constants to apply for each of the above referenced factors. In other words, data visualization program 112 determines a constant to apply for levels of classification, level of encryption, method of encryption, and other mechanism. In an embodiment, the constants are received via user input or stored in information repository 114 previously and retrieved. In an embodiment, the constants may be thresholds that are used to classify different risk levels (low, medium, high, for example).

Figure 3:
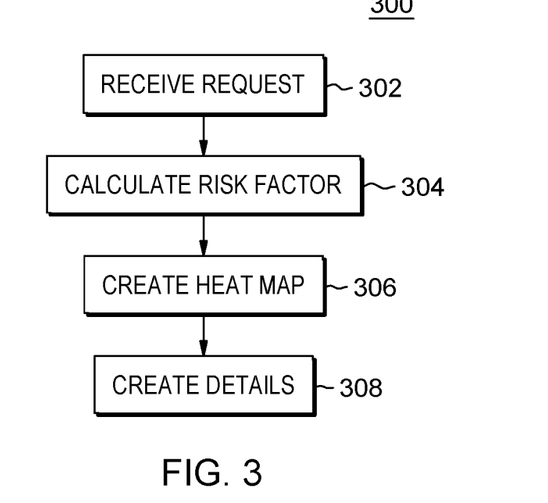
FIG. 3 is a flow chart diagram depicting operational steps for data visualization program 112 for visualization of data risk, in accordance with at least one embodiment of the invention.

FIG. 3 is a flow chart diagram of workflow 300 depicting operational steps for data visualization program 112 for visualization of data risk in accordance with at least one embodiment of the invention. In an alternative embodiment, the steps of workflow 300 may be performed by any other program (not shown) while working with data visualization program 112. It should be appreciated that embodiments of the present invention provide at least for visualization of data risk. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 300 upon a user wanting to visualize data risk.

Data visualization program 112 receives a request (step 302). In an embodiment, data visualization program 112 receives a request to create a heat map and/or associated details for a one or more pieces of data. In an embodiment, the one or more pieces of data are analyzed and monitored by data visualization program 112.

Data visualization program 112 calculates risk factor (step 304). In an embodiment, data visualization program 112 calculates the risk factor (RF) for each piece of data using equation (1). In an embodiment, C is the classification of the data, L is the layer of encryption of the data, M is type of encryption of the data, and O is other mechanism applied to the data. In an embodiment, $\alpha$ is the constant applied to L, $\beta$ is the constant applied to M, and $\gamma$ is the constant applied to O.

$$\text{Risk Factor } (RF) = \frac{1}{C \times \sum \alpha \times L + (\beta \times M) + \sum \gamma \times O} \quad \text{Equation (1)}$$

In an embodiment, a piece of data, or block of data, that has multiple levels of encryption of the data or multiple other mechanism applied to the data may have a reduced risk factor.

Figure 4:
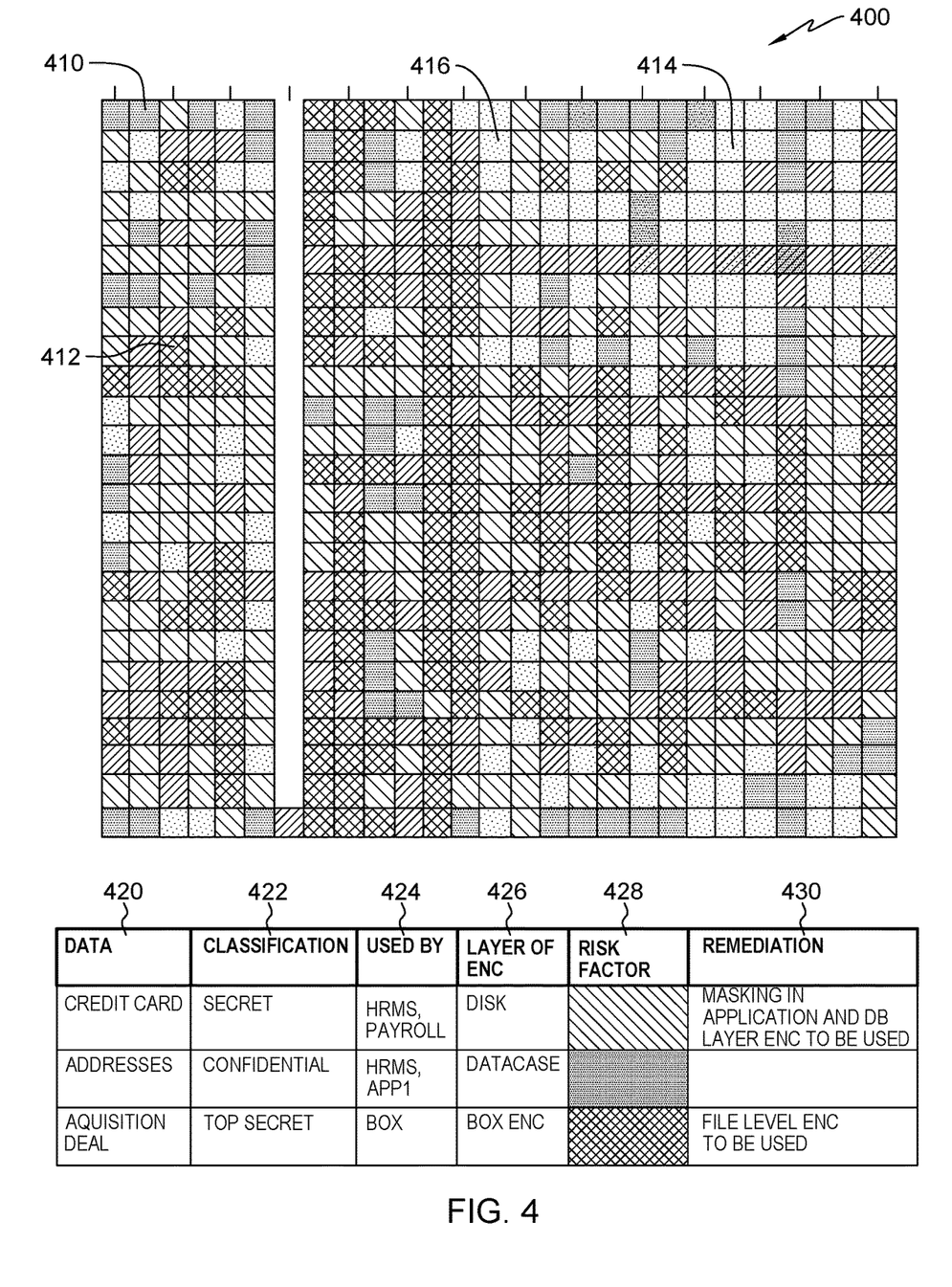
FIG. 4 is an example of a heat map and associated details about the data in the heat map, in accordance with at least one embodiment of the invention.

Data visualization program 112 creates heat map (step 306). At step 306, data visualization program 112 creates a heat map for the requested data. In an embodiment, the heat map is a visual overlay of the risk factor for each piece of data. In other words, each piece of data has a specific risk factor associated with it. In an embodiment, the heat map may have different levels of risk factor based on where the risk factor is relative to one or more thresholds. For example, risk factors below a first threshold may have a first level of risk, as shown by the hashing found for data 410 in FIG. 4. Continuing this example, a risk factor may be above a first threshold but below a second threshold, as shown by the hashing found for data 412 in FIG. 4. Even furthering this example, a risk factor may be above a second threshold, as shown by the hashing found for data 414 and data 416 in FIG. 4. In As shown in FIG. 4, each piece of data has an associated risk factor level and how it is relative to one or more thresholds. In this example, there are five different risk factor levels as shown by five different hashings which means there are four different thresholds for the risk factor.

Data visualization program 112 creates details (step 308). At step 308, data visualization program 112 creates additional details for one or more pieces of data. In an embodiment, this may be for all pieces of data. In an alternative embodiment, this may be for pieces of data requested by a user. In an embodiment, as shown in FIG. 4, the details include, but are not limited to, the type of data 420, classification of data 422, who uses the data 424, the layer of data 426, the risk factor of the data 428, and any type of remediation 430. In an embodiment, the types of remediation include, but are not limited to, based on the need of an organization, if the risk level is too low or high, data visualization program 112 may recommend increasing or decreasing the level of encryption, changing the type of encryption to more or less secure (for example, if a piece of data is encrypted using 128 bit AES and the risk factor is too high for that piece of data, data visualization program 112 may recommend using 256 bit AES), or by recommending other mechanisms to be applied or removed to a piece of data to increase or decrease the level of risk for that piece of data.

FIG. 4 is an example of a heat map and associated details about the data in the heat map, in accordance with at least one embodiment of the invention. As discussed above, the heat map 400 includes a risk factor level for each piece of data based on the risk factor for each piece of data relative to one or more thresholds. In this example, heat map 400 includes five different hashings, and therefore five different risk factor levels that are defined by four different thresholds. In other embodiment, there may be any number of risk factor levels that are defined by the appropriate number of thresholds. In an embodiment, colors, shapes, or another other visual indication may be used to indicate, in the heat map, the risk factors and what type of risk factor each piece of data has, based on the defined number of thresholds. FIG. 4 also includes example associated details about requested pieces of data, as described above.

Figure 5:
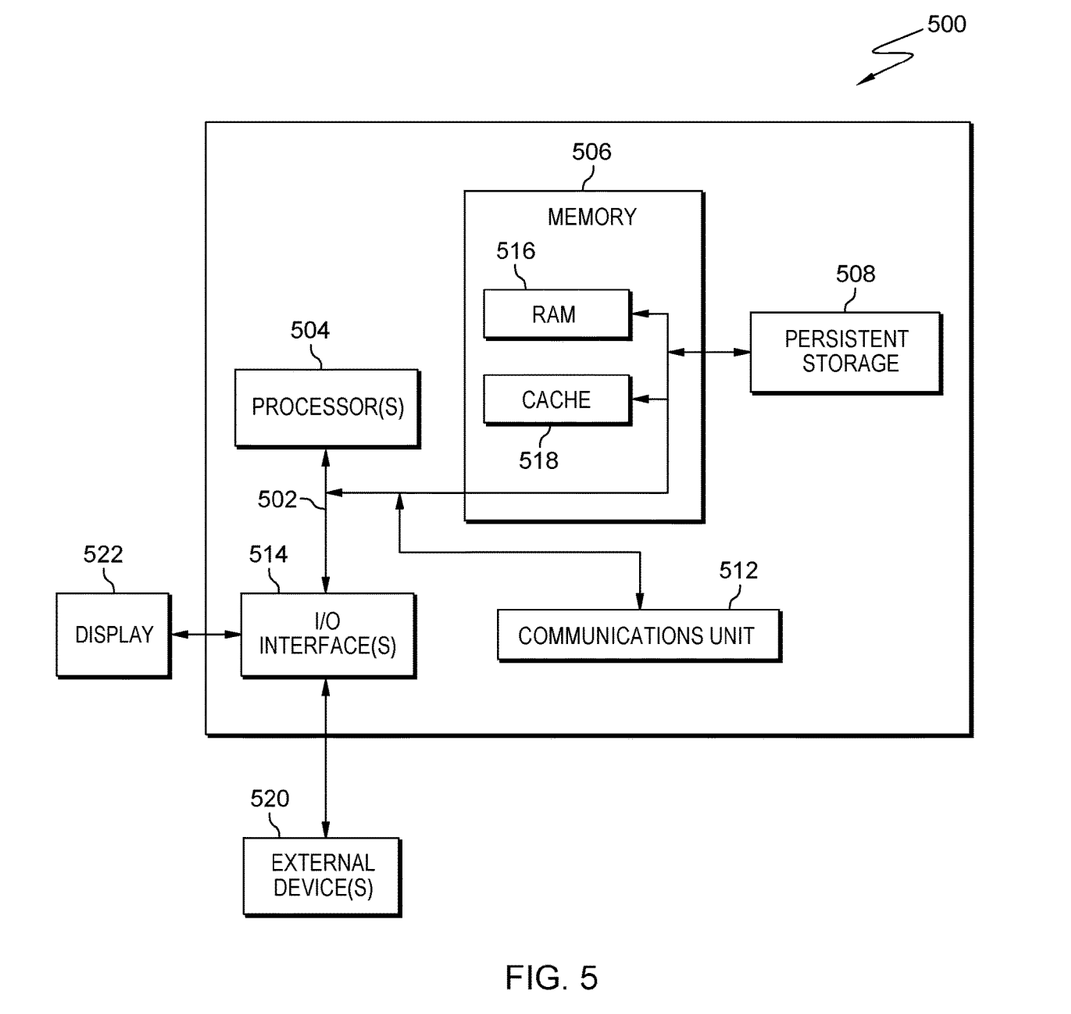
FIG. 5 is a block diagram depicting components of a computer, generally designated 400, suitable for executing central optimization program 112 and local optimization program 122, in accordance with at least one embodiment of the invention.

FIG. 5 is a block diagram depicting components of a computer 500 suitable for data visualization program 112, in accordance with at least one embodiment of the invention. FIG. 5 displays the computer 500, one or more processor(s) 504 (including one or more computer processors), a communications fabric 502, a memory 506 including, a RAM 516, and a cache 518, a persistent storage 508, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and input/output (I/O) interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a random-access memory (RAM) 516 and a cache 518. In general, the memory 506 may comprise any suitable volatile or non-volatile one or more computer readable storage media.

Program instructions for data visualization program 112 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 512, in these examples, provides for communications with other data processing systems or devices. In these examples, the communications unit 512 may comprise one or more network interface cards. The communications unit 512 may provide communications through the use of either or both physical and wireless communications links. In the context of some embodiments of the present invention, the source of the various input data may be physically remote to the computer 500 such that the input data may be received, and the output similarly transmitted via the communications unit 512.

The I/O interface(s) 514 allow for input and output of data with other devices that may operate in conjunction with the computer 500. For example, the I/O interface 514 may provide a connection to the external devices 520, which may be as a keyboard, keypad, a touch screen, or other suitable input devices. External devices 520 may also include portable computer readable storage media, for example thumb drives, portable optical or magnetic disks, and memory cards. Software and data used to practice embodiments of the present invention may be stored on such portable computer readable storage media and may be loaded onto the persistent storage 508 via the I/O interface(s) 514. The I/O interface(s) 514 may similarly connect to a display 522. The display 522 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for determining risk factors, the computer-implemented method comprising:
   determining a level of classification for each piece of data of one or more pieces of data, the one or more pieces of data received over a communications link from a communications unit;
   determining a layer of encryption for each piece of data of the one or more pieces of data;
   determining a type of encryption for each piece of data of the one or more pieces of data;
   determining other mechanisms applied to each piece of data of the one or more pieces of data;
   determining a first constant for the layer of encryption, a second constant for the type of encryption, a third constant for the other mechanisms applied; and
   calculating a risk factor for each piece of data of the one or more pieces of data, wherein the risk factor is calculated using the equation:

$$\text{Risk Factor } (RF) = \frac{1}{C \times \sum \alpha \times L + (\beta \times M) + \sum \gamma \times O}$$

where: C is the level classification of the data, L is the layer of encryption of the data, M is the type of encryption of the data, O is other mechanism applied, $\alpha$ is the first constant, $\beta$ is the second constant, and $\gamma$ is the third constant.

2. The computer-implemented method of claim 1, wherein the risk factor for each piece of data is determined using the level of classification, the layer of encryption, the first constant, the type of encryption, the second constant, the other mechanisms applied, and the third constant for each piece of data.

3. The computer-implemented method of claim 1, further comprising:
   creating, by one or more computer processors, a heat map visualization of the one or more pieces of data, wherein the heat map visualization includes two or more risk factor levels defined by three or more thresholds.

4. The computer-implemented method of claim 3, further comprising:
   creating, by one or more computer processors, additional details in the heat map visualization for the one or more pieces of data, wherein the additional details are selected from the group consisting of a type of data, a classification of data, who uses a data, a layer of data, a risk factor of the data, and remediation for a data, for each piece of data of the one or more pieces of data.

5. The computer-implemented method of claim 1, wherein each level of classification, layer of encryption, type of encryption, and other mechanisms is assigned a score.

6. The computer-implemented method of claim 1, wherein the other mechanisms are selected from the group consisting of identity and access management (IAM), intrusion detection system(s) (IDS), intrusion detection and prevention systems (IDPS), and physical security.

7. A computer program product for determining risk factors, the computer program product comprising:
   one or more computer readable storage media; and
   program instructions stored on the one or more computer readable storage media, the program instructions comprising:
      program instructions to determine a level of classification for each piece of data of one or more pieces of data, the one or more pieces of data received over a communications link from a communications unit;
      program instructions to determine a layer of encryption for each piece of data of the one or more pieces of data;
      program instructions to determine a type of encryption for each piece of data of the one or more pieces of data;
      program instructions to determine other mechanisms applied to each piece of data of the one or more pieces of data;
      program instructions to determine a first constant for the layer of encryption, a second constant for the type of encryption, a third constant for the other mechanisms applied; and
      program instructions to calculate a risk factor for each piece of data of the one or more pieces of data, the risk factor being calculated using the equation:

$$\text{Risk Factor } (RF) = \frac{1}{C \times \sum \alpha \times L + (\beta \times M) + \sum \gamma \times O}$$

where: C is the level of classification of the data, L is the layer of encryption of the data, M is the type of encryption of the data, O is other mechanism applied, α is the first constant, β is the second constant, and γ is the third constant.

8. The computer program product of claim 7, wherein the risk factor for each piece of data is determined using the level of classification, the layer of encryption, the first constant, the type of encryption, the second constant, the other mechanisms applied, and the third constant for each piece of data.

9. The computer program product of claim 7, further comprising one or more of the following program instructions, stored on the one or more computer readable storage media, to:
create a heat map visualization of the one or more pieces of data, wherein the heat map visualization includes two or more risk factor levels defined by three or more thresholds.

10. The computer program product of claim 9, further comprising one or more of the following program instructions, stored on the one or more computer readable storage media, to:
create additional details in the heat map visualization for the one or more pieces of data, wherein the additional details are selected from the group consisting of a type of data, a classification of data, who uses a data, a layer of data, a risk factor of the data, and a remediation for a data, for each piece of data of the one or more pieces of data.

11. The computer program product of claim 7, wherein each level of classification, layer of encryption, type of encryption, and other mechanisms is assigned a score.

12. The computer program product of claim 7, wherein the other mechanisms are selected from the group consisting of identity and access management (IAM), intrusion detection system(s) (IDS), intrusion detection and prevention systems (IDPS), and physical security.

13. A computer system for determining risk factors, the computer system comprising:
one or more computer processors;
one or more computer readable storage media; and
program instructions, stored on the one or more computer readable storage media for execution by at least one of the one or more computer processors, the program instructions comprising:
program instructions to determine a level of classification for each piece of data of one or more pieces of data, the one or more pieces of data received over a communications link from a communications unit;
program instructions to determine a layer of encryption for each piece of data of the one or more pieces of data;
program instructions to determine a type of encryption for each piece of data of the one or more pieces of data;
program instructions to determine other mechanisms applied to each piece of data of the one or more pieces of data;
program instructions to determine a first constant for the layer of encryption, a second constant for the type of encryption, a third constant for the other mechanisms applied; and
program instructions to calculate a risk factor for each piece of data of the one or more pieces of data, the risk factor being calculated using the equation:

$$\text{Risk Factor } (RF) = \frac{1}{C \times \sum \alpha \times L + (\beta \times M) + \sum \gamma \times O}$$

where: C is the level of classification of the data, L is the layer of encryption of the data, M is the type of encryption of the data, O is other mechanism applied, α is the first constant, β is the second constant, and γ is the third constant.

14. The computer system of claim 13, wherein the risk factor for each piece of data is determined using the level of classification, the layer of encryption, the first constant, the type of encryption, the second constant, the other mechanisms applied, and the third constant for each piece of data.

15. The computer system of claim 13, further comprising one or more of the following program instructions, stored on the one or more computer readable storage media, to:
create a heat map visualization of the one or more pieces of data, wherein the heat map visualization includes two or more risk factor levels defined by three or more thresholds.

16. The computer system of claim 15, further comprising one or more of the following program instructions, stored on the one or more computer readable storage media, to:
create additional details in the heat map visualization for the one or more pieces of data, wherein the additional details are selected from the group consisting of a type of data, a classification of data, who uses a data, a layer of data, a risk factor of the data, and a remediation for a data, for each piece of data of the one or more pieces of data.

17. The computer system of claim 13, wherein each level of classification, layer of encryption, type of encryption, and other mechanisms is assigned a score.

18. The computer system of claim 13, wherein the other mechanisms are selected from the group consisting of identity and access management (IAM), intrusion detection system(s) (IDS), intrusion detection and prevention systems (IDPS), and physical security.

* * * * *